Oct. 13, 1970    H. A. SMITH ET AL    3,533,689
ASSEMBLY FOR FACILITATING INSERTION AND SELECTIVE
POSITIONING OF MICROFICHE IN READERS
Filed April 25, 1967    3 Sheets-Sheet 1

HOMER A. SMITH
CLARENCE R. TAYLOR
JAMES D. SHAW
INVENTORS

BY John W. Husser
Robert W. Hampton
ATTORNEYS

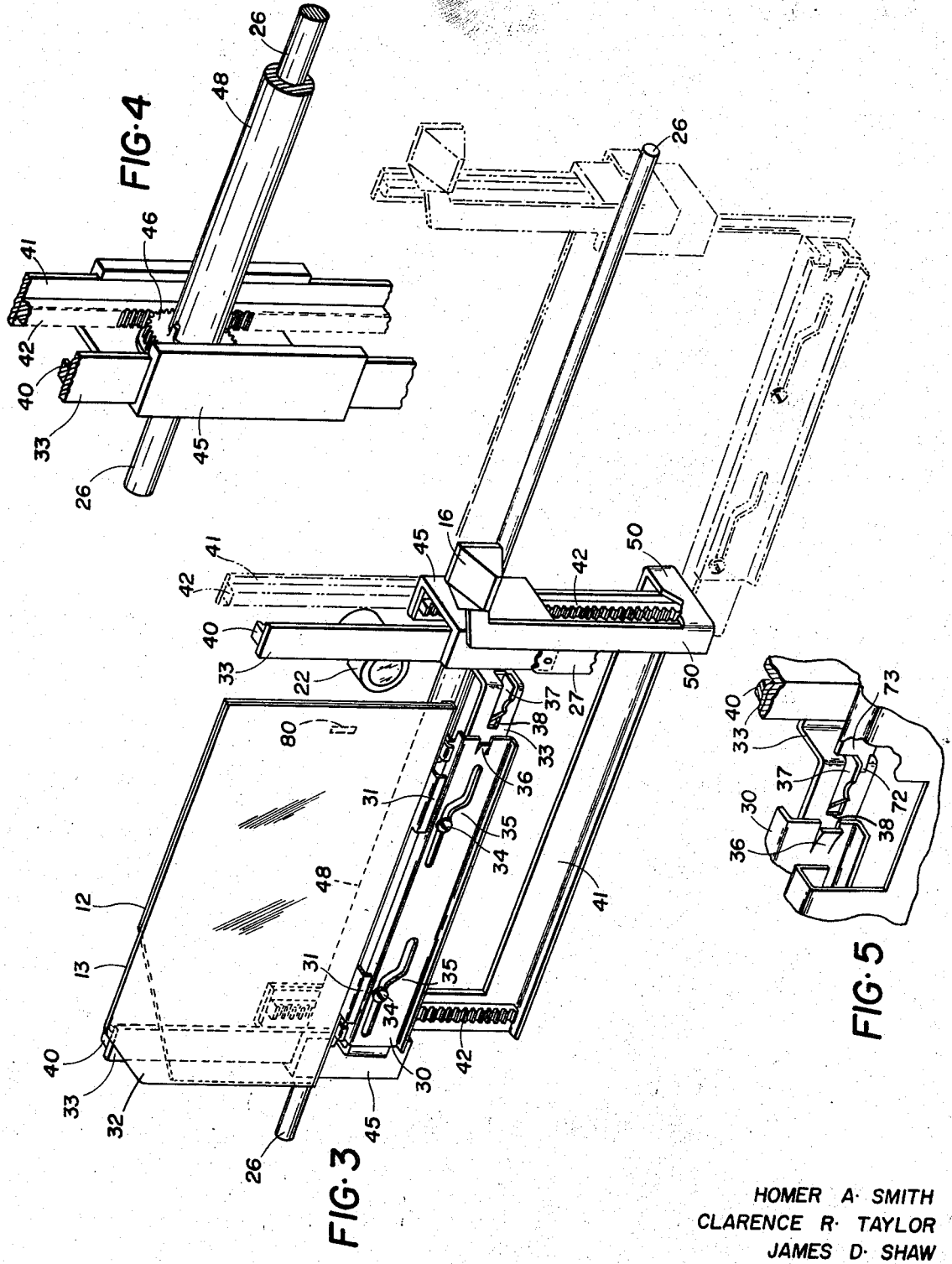

Oct. 13, 1970   H. A. SMITH ET AL   3,533,689
ASSEMBLY FOR FACILITATING INSERTION AND SELECTIVE
POSITIONING OF MICROFICHE IN READERS
Filed April 25, 1967   3 Sheets-Sheet 3
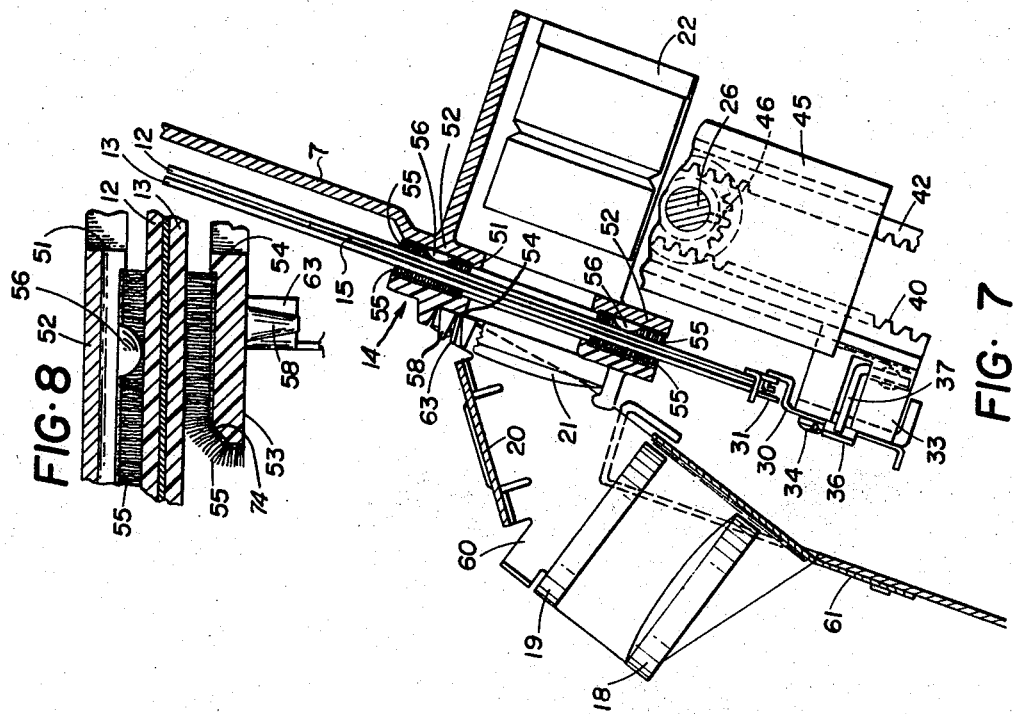
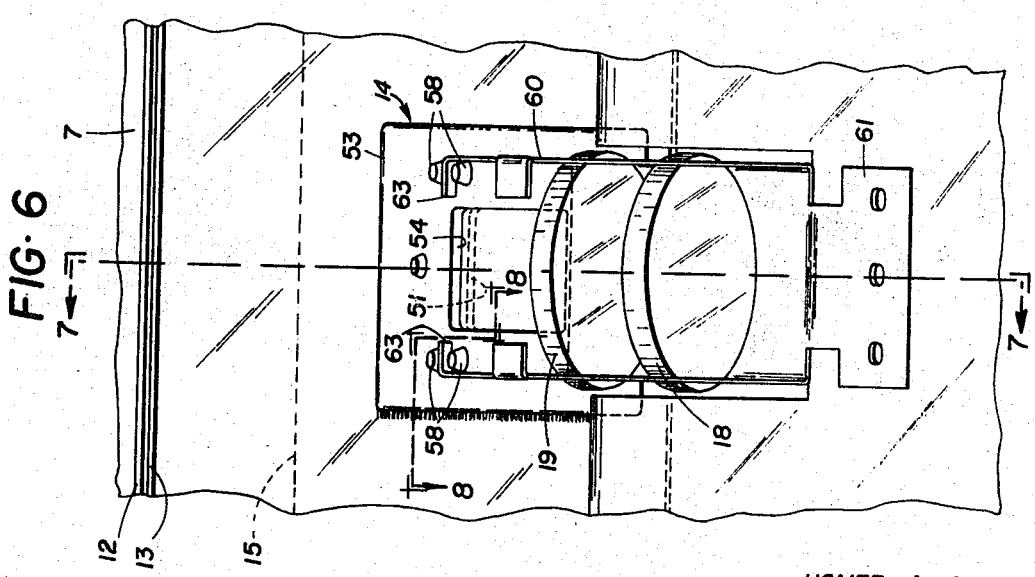
HOMER A. SMITH
CLARENCE R. TAYLOR
JAMES D. SHAW
INVENTORS
BY *John W. Husser*
*Robert W. Hampton*
ATTORNEYS

United States Patent Office 3,533,689
Patented Oct. 13, 1970

3,533,689
ASSEMBLY FOR FACILITATING INSERTION AND SELECTIVE POSITIONING OF MICROFICHE IN READERS
Homer A. Smith, Clarence R. Taylor, and James D. Shaw, Rochester, N.Y., assignors to Eastman Kodak Company, Rochester, N.Y., a corporation of New Jersey
Filed Apr. 25, 1967, Ser. No. 633,570
Int. Cl. G03b 23/08
U.S. Cl. 353—27
10 Claims

ABSTRACT OF THE DISCLOSURE

An assembly for use with a projection reader comprising a microfiche carriage which is universally movable in the object plane of the reader and has an indicator arm connected thereto and extending over a visible, index panel on which interchangeable index cards corresponding to varying microfiche format can be releasably secured. The assembly also includes a film gate having fixed and movable members which are covered with resilient pads of compliant fabric material and transparent flats, for holding the microfiche, which are slidable on the carriage, into and out of the film gate in order to facilitate insertion of the microfiche in the holder. An interlock is provided for the carriage when the holder is moved out of the film gate.

---

The present invention relates to projection readers of the type adapted to project onto a viewing screen, images from a microfiche, i.e., film card, and more particularly, to improved structure for facilitating both the insertion of microfiche into such readers and the selective positioning of images on the microfiche with respect to the optical system thereof.

In the art of microfiche readers; i.e., devices for projecting onto a viewing screen images from a film card having a plurality of discrete image areas, it is well known to provide a carriage which supports the microfiche for movement in an object plane normal to the projection axis so that images thereon can be selectively aligned with the projection axis for viewing. In apparatus of this type wherein the microfiche images are projected by passing light therethrough, the microfiche in its supported position on the carriage is necessarily disposed between elements of the optical system, viz, the illuminating means and image-focusing means.

In such a disposition, the microfiche and its carriage have, in prior art devices, been substantially obscured from the operators view so that a problem exists in selectively aligning the microfiche with respect to the projection axis. Assemblies for selectively positioning the microfiche have therefore operated on the principle of indexing the movement of the carriage with respect to the projection axis and locating the microfiche in a predetermined position on the carriage. A carriage-movement index is located in view of the operator and means are provided for remotely positioning, by reference to the index, the carriage and, hence, the microfiche thereon.

Several difficulties exist with respect to such prior art techniques. Firstly, the necessity of locating the microfiche carriage for movement in an object plane between elements of the optic system presents a problem of considerable difficulty in providing for facile, yet properly positioned, insertion of the microfiche into the viewing apparatus.

Secondly, such procedures create problems where microfiche are constructed of varying format, for most commonly used carriage indexes are not readily adaptable for the different microfiche format.

The present invention comprises an improved microfiche-carriage arrangement having an image-locating indicator which cooperates with a readily interchangeable index system to facilitate the selective positioning, with respect to the reader optics, of images on microfiche of differing format. The present invention also comprises improved card holding structure which cooperates with improved film gate structure and interlock mechanism to further facilitate insertion and positioning of the microfiche in the viewing apparatus.

It is therefore an object of the present invention to provide an improved apparatus for facilitating the use of microfiche in a projection viewer.

Another important object of the present invention is to provide improved apparatus for facilitating the insertion of microfiche into a projection viewer.

Another object of the present invention is to provide improved apparatus for selectively positioning images on microfiche of varying format with respect to the projection axis of a viewer.

Yet another object of the present invention is to provide an improved film gate assembly for facilitating the insertion and positioning of microfiche in a reader.

These and other objects will be apparent to one skilled in the art from the following description with reference to the drawings in which like characters denote like parts and wherein:

FIG. 3 is a perspective view showing portions of the improved microfiche insertion and positioning assembly of the present invention;

FIG. 4 is an enlarged perspective of a portion of the assembly shown in FIG. 3;

FIG. 5 is an enlarged perspective view of another portion of the assembly shown in FIG. 3;

FIG. 6 is a front view of the film gate of the reader having portions of the optic system and reader housing removed;

FIG. 7 is a sectional view taken along line 7—7 of FIG. 6 and showing the film gate of the reader and portions of the reader optics and microfiche insertion and positioning assembly as they cooperate therewith; and FIG. 8 is a view taken along line 8—8 of FIG. 6.

Figure 1:
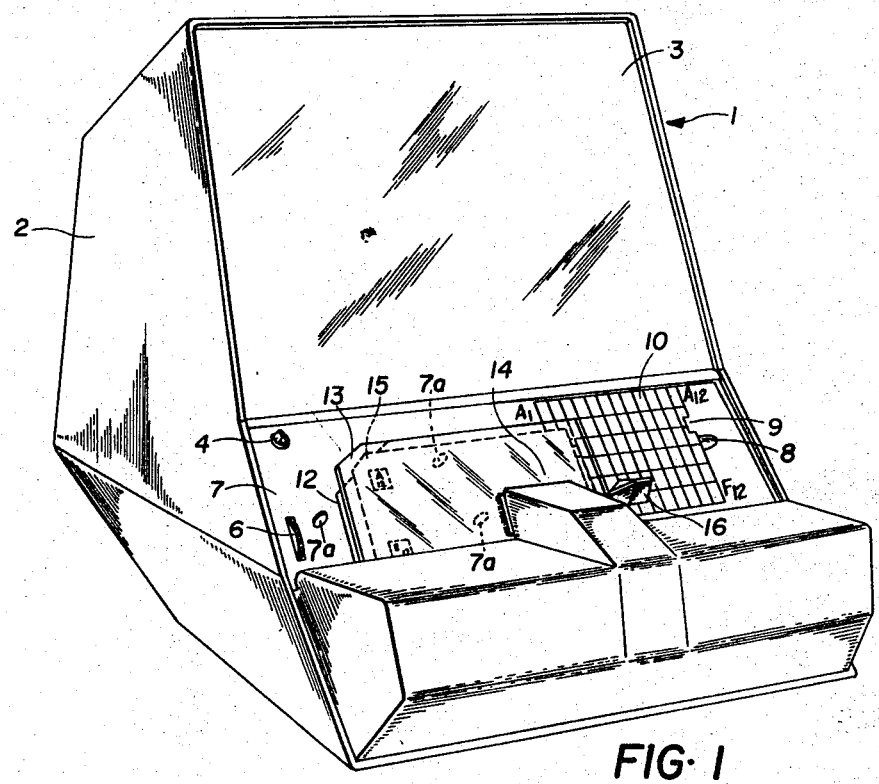
FIG. 1 is a front perspective of a reader incorporating an embodiment of the improved microfiche inserting and positioning structure of the present invention.
Figure 2:
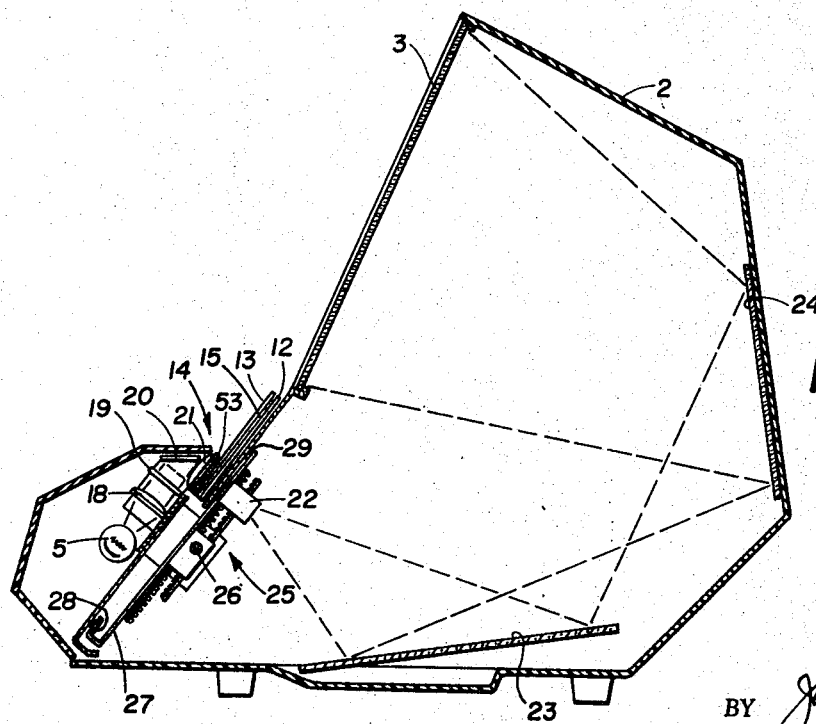
FIG. 2 is a sectional side view of the reader shown in FIG. 1.

By referring to FIGS. 1 and 2 the general arrangement of the elements of projection reader 1 can be seen in conjunction with elements of the improved microfiche insertion and positioning assembly of the present invention. The reader 1 includes a main frame and housing 2 having a viewing screen 3 located in the front thereof. A control switch 4 for the projection lamp 5 and focus control wheel 6 extend through panel 7 located beneath the screen 3. The panel 7 has a recessed portion adapted to receive an index card 10. Tabs 9 extend from panel 7 on opposite sides of the recessed portion for releasably securing the index card 10 therein. Various index cards 10 can be prepared having an index grid which corresponds to microfiche of varying format. The cards are preferably made of flexible material so as to permit bending for inserting the cards in the panel recess beneath tabs 9. A finger depression 8 may be also provided in the panel surface to facilitate removal of the index cards.

Also shown in FIGS. 1 and 2, a pair of opposed transparent flats 12 and 13 rest on panel 7 or, alternatively, on skids 7a which are constructed of non-abrasive material and mounted on the panel behind the flats. In the viewing position, the flats 12 and 13 extend between a film gate 14 with the microfiche 15 supported therebetween. An index pointer 16 is operatively connected to the flats 12 and 13 by mechanism hereinafter to be described and is disposed for movement above index card 10.

The optic system of the reader 1 comprises a projection lamp 5, a condenser element 18, a heat glass 19, mirror 20, condenser element 21, the image-focusing lens 22 and mirrors 23 and 24. The paths of the light from lamp 5 passing through the image-focusing lens 22 and onto screen 3 are indicated by broken lines in FIG. 2. The microfiche carriage designated generally 25, to be subsequently described in detail, can also be seen in FIG. 2; and, it will be noted that this assembly is mounted in housing 2 on shaft 26. The carriage 25 has a resilient positioning bar 27 attached thereto, which bar has nylon skids 28 and 29 locked on opposite ends thereof for engaging flat surfaces provided inside the housing 2 to position the carriage assembly for movement in a plane substantially perpendicular to the axis of projection of lens 22.

A portion of the microfiche positioning and insertion assembly will now be described with reference to FIGS. 3–5. The assembly comprises a pair of transparent flats 12 and 13 suitably constructed of plastic or glass, the rear flat 12 being hingedly connected to a slide member 30 and having stop portions 31 which engage the slide member 30 to limit forward movement of the flats 12 and 13. The front flat 13 is hingedly connected along the bottom edge to the rear flat 12 so that, when free of the film gate 14, the top thereof can be contacted at portion 32 and swung forward to facilitate insertion of a microfiche between the flats.

The slide member 30 is slidably mounted on the base of U-shaped member 33 by means of screws 34 which extend through notches 35 formed in the slide member 30. The slide member 30 also comprises a camming tab 36 which cooperates with an inclined surface on interlock lug 37. The lug or member 37 is resiliently urged by means (not shown) attached to the back of the base of member 33, through a slot 38 formed in member 33. When slide member 30 is moved to its rightmost position in notches 35, the lug 37 is displaced back through the slot 38 by camming tab 36.

The carriage 25 comprises the U-shaped member 33 which has a gear rack 40 built onto the inner surface of each of the upright portions thereof. The carriage 25 further comprises another similar U-shaped member 41 which has corresponding gear racks 42 built onto the inner surfaces of the upright members thereof and located in an opposed relation with respect to the racks 40 of member 33. The members 33 and 41 are slidingly mounted in opposed relation in brackets 45 and are operatively connected by gears 46. The gears 46 are respectively disposed between each opposed pair of racks and rotatably mounted on shaft 26 which extends between members 33 and 41 and at right angles with respect to the upright portions thereof. The shaft 26 also extends through brackets 45 and a spacing shaft 48 which is keyed to gears 46 for rotation therewith, so that the brackets 45, the opposed U-shaped members 33 and 41, gears 46 and shaft 48 are slidable as a unit along shaft 26 in a direction substantially parallel to the object plane of the reader.

As can best be seen in FIG. 3, the U-shaped member 41 has an indicator arm 50 which is attached to the base thereof and extends around bracket 45 and upwardly, terminating in pointer 16.

By referring to FIGS. 1, 3, and 4, it can be seen, therefore, that vertical movement of indicator arm 50 and, hence, of U-shaped member 41 provides an opposite vertical movement to U-shaped member 33 which is transmitted through racks 40 and 42 and gears 46. It can also be seen that horizontal movement of the arm 50 in either direction provides a corresponding horizontal sliding movement of the entire carriage 25 along shaft 26. Referring particularly to FIG. 1, it will be noted therefore that pointer 16 can be moved in any direction over index card 10 to provide universal movement of the carriage and microfiche supported thereby in the manner described above.

The film gate 14 of the present invention which cooperates with the previously described structure to facilitate a properly positioned insertion of the microfiche in the object plane of the reader will now be described with reference to FIGS. 1, 2, and 6–8. As can be seen in FIGS. 1 and 2, the film gate 14 is centrally located adjacent the index portion of panel 7 on which index card 10 is releasably secured.

As shown more clearly in FIGS. 6–8, the film gate 14 comprises a fixed member 52 defining an aperture 51 which is optically aligned with respect to image-focusing lens 22 and other elements of the reader projection system. The gate 14 also comprises a movable member 53 having an aperture 54 therein, which is aligned with the aperture 51 in fixed member 52. Surrounding each of the apertures and on substantially the entire surface of members 52 and 53 are provided compliant pads 55 formed of resilient fabric material such as, for example, felt or mohair. As can be seen in FIGS. 7 and 8, small skids 56 formed of non-abrasive material may be provided on the fixed member 52 to reinforce the pad 55 thereon.

As can be best seen in FIGS. 6 and 7, the movable gate member 53 comprises two sets of small studs 58 defining V-shaped notches therebetween. A bracket 60 which houses elements of the optic system is fixed at one end 61 with respect to the reader housing. The bracket 60 is formed of flexible material and has a pair of inwardly extending ears 63 which are resiliently urged into the V-notches between studs 58 as shown in FIGS. 6 and 7.

It will therefore be seen that the movable gate member 53 is biased towards fixed gate 52 so that when a microfiche located between flats 12 and 13 is moved into film gate 14, it will be positioned between the pads 55 and maintained in the object plane, perpendicular to the projection axis.

In order to obtain projection of images on the microfiche inserted between flats 12 and 13, the flats must, of course, be moved into film gate 14 and aligned with the projection axis of the reader as shown in FIGS. 1 and 6. However, such a disposition of the flats prevents facile opening thereof for inserting the microfiche. It will be appreciated, by referring to FIG. 1, that because of the compact design of the reader and the arrangement of the indicator arm 50, it is not desirable to provide sufficient horizontal travel for carriage 25 to clear flats 12 and 13 from the film gate 14.

For these and other reasons, the slide member 30, connecting the carriage 25 and flats 12 and 13, has been provided. As illustrated in FIG. 3, when the carriage is in its leftmost and lowermost position of travel, the slide member 30 can be moved further left on screws 34 and out from the film gate 14 in order to facilitate opening of the flat 13 for insertion or removal of a microfiche. It will also be noted that the flats are slightly raised by the configuration of notches 35 to further facilitate the insertion procedure.

As can be seen in FIGS. 3 and 5, when the slide member 30 is moved left from its normal viewing position on member 33 for insertion or removal of microfiche, the interlock lug 37 moves out from notch 38 and engages members 72 and 73 of the reader frame 2 in order to prevent movement of the carriage 25 until the slide has been moved back to its normal viewing position and again depressed lug 37. Such an interlock prevents damage to the flats and other portions of the viewing apparatus caused by movement of the carriage with the flats open.

When a card has been inserted and the flats 12 and 13 are closed, the slide can be moved back to the right so that the flats pass between the fixed and movable members of the film gate 14. As can best be seen in FIG. 8, the movable gate member 53 is provided with an inclined guide edge 74 which, when engaged by the flats 12 and 13 moving thereagainst, causes the movable member 53 to open against the resilient force of bracket 60. It will be noted that the hinged connection between ears 63 of bracket 60 and studs 58 of the movable gate member 53 in combination with the flexure of bracket 60 provide a uniform distribution of pressure over the substantially entire gate area. It will also be noted that the compliant pads 55 conform to variations in the surface of the flats 12 and 13 to further distribute the gate pressure so that when the flats 12 and 13 are selectively positioned therebetween, they are maintained in position until again moved moved by movement of the carriage 25. In addition to providing excellent holding and positioning means for the flats 12 and 13, the pads 55 also serve to prevent scratching or marring and to clean the flats as they are moved over the pads 55.

It will, of course, be appreciated that the slide member 30 could be provided with clamping means or other suitable structure for attaching microfiche thereto, and that the improved gate structure for facilitating insertion of the microfiche into the viewing apparatus would prove similarly advantageous for such embodiments.

Having described the elements of the apparatus in detail, a brief description of the operation of the reader will be of assistance to understanding the novel features of the present invention embodied therein.

When a given microfiche is desired to be used in the reader 1, an index card 10 is prepared having identifying indicia located thereon in configuration corresponding to the format, i.e., arrangement of discrete images of the microfiche. It will be appreciated that inasmuch as the holder flats 12 and 13, mounted on carriage 25, are universally movable in the object plane, index cards can be provided to facilitate selective alignments, with the projection axis, of images on microfiche of any conceivable format.

When the proper index card 10 has been inserted under tabs 9 on the index portion of panel 7, the slide member 30 can be moved to the left position, and the given microfiche inserted between holder flats 12 and 13 and aligned in the proper relative position with respect to the index system by suitable means such as a mark 80 on the flat 12 (see FIG. 3). When the microfiche is properly positioned, the slide member 30 can be returned to the normal viewing position moving the flats 12 and 13 between gate members 52 and 53 in the manner previously described. The carriage 25 is then free from the interlock 37 so that the pointer 16 can be moved to a selected position over the index card 10. Movement of the pointer 16 moves carriage 25 and the microfiche between flats 12 and 13 in the manner described above so as to align with the projection axis, the image on the microfiche corresponding to the selected indicia on the index card. By referring to FIG. 1, it will be seen that the index indicia are located on index card 10 in an order horizontally reversed to that of the microfiche but corresponding vertically to the microfiche arrangement so as to properly index the relative movement which the indicator arm effects on the member 33 of carriage 25. Because the carriage 25 is universally movable, the pointer 16 can be moved over an index card 10 in any direction, i.e., horizontally, vertically or diagonally.

By modifying the pointer 16 to cooperate with suitably constructed index cards, as for example, by engagement of the pointer with notches or holes provided in the card, the indicator arm can be caused to follow given paths of travel thus effecting programmed scanning of the microfiche.

The present invention has been described in detail with particular reference to preferred embodiments thereof, but it will be understood that variations and modifications can be effected within the spirit and scope of the invention as described hereinabove and as defined in the appended claims.

We claim:

1. In a viewing device having an optic path and adapted to project images from an image bearing medium onto a viewing screen and having image-illuminating means and image-focusing means, the medium having at least first and second image portions, an assembly for facilitating insertion and positioning of the medium to be viewed, comprising:
   (a) means for holding the medium in a predetermined object plane which intersects the optic path of said viewing device and passes between the image-illuminating and image-focusing means thereof;
   (b) carriage means for supporting said means for holding, said carriage means being mounted for movement in said object plane along at least first and second, mutually perpendicular directions from a first position so that the first image portion is aligned with the optic path to a second position so that the second image portion is aligned with the optic path; and
   (c) means for slidably connecting said means for holding and said carriage means so that, in at least one carriage position, said means for holding can be moved relative to said carriage means from a first position intersecting the optic path to a second position which does not intersect the optic path.

2. Apparatus as claimed in claim 1, wherein said carriage means includes an interlock member and means for flexibly biasing said interlock member from a first position wherein said means for slidably connecting is disposed in its first position to engage said interlock member and to thereby allow said carriage means to be freely moved, to a second position wherein said means for slidably connecting is disposed in its second position and said interlock member limits the movement of said carriage means.

3. In a viewing device having an optic path and adapted to project images from an image bearing medium to a viewing screen and having image-illuminating means and image-focusing means, the medium having at least first and second image portions, an assembly for facilitating insertion and positioning of the medium to be viewed, comprising:
   (a) means for holding the medium in a predetermined object plane which intersects the optic path of said viewing device and passes between said image-illuminating and image-focusing means thereof;
   (b) carriage means for supporting said means for holding, said carriage means being mounted for movement in said object plane along at least first and second, mutually perpendicular directions from a first position so that the first image portion is aligned with the optic path to a second portion so that the image portion is aligned with the optic path;
   (c) means for slideably connecting said means for holding and said carriage means so that, in at least one carriage position, said means for holding can be moved relative to said carriage means from a first position intersecting the optic path to a second position which does not intersect the optic path; and
   (d) means responsive to movement of said means for holding to said second position for preventing movement of said carriage means.

4. The invention defined in claim 3 wherein said means for holding comprises a pair of opposed transparent sheets attached to said means for connecting and adapted to receive the medium therebetween, at least one of said sheets being hingedly connected along an edge to said means for connecting.

5. The invention defined in claim 4 further comprising a gate including:
   (a) a fixed member located on one side of said object plane and having an aperture therein aligned with said optic path; and
   (b) a movable member located on the opposite side of said object plane and having an aperture therein aligned with said optic path, said movable member being resiliently urged towards said fixed member.

6. The invention defined in claim 5 wherein said members of said gate have resilient pads of soft compliant material substantially surrounding said apertures therein.

7. The invention defined in claim 5 wherein said movable member has a guide surface on an edge thereof adjacent said means for holding.

8. The invention defined in claim 6 further comprising at least one resilient member fixed at one end with respect to said viewing device and having means thereon for hingedly engaging said movable member.

9. The invention as defined in claim 3 further comprising:
   (a) an index panel having a planar surface substantially parallel to said predetermined object plane and being located on the exterior of said viewing device adjacent said optic path so as to be visible to the operator of said viewing device;
   (b) means for releasably securing to said index panel, index cards having indicia patterns thereon related to the format of the particular image bearing medium to be inserted in said means for holding; and
   (c) an index arm extending from said carriage means for movement therewith and having a pointer portion disposed over said index panel for movement in a plane substantially parallel to said object plane in response to movement of said carriage means.

10. Apparatus for selectively positioning in optical alignment between image-illuminating means and image-focusing means of a projection viewer, selected images from an image bearing medium, the projector viewer having a projection axis, said apparatus comprising:
   (a) means supporting the medium for movement in a predetermined object plane between the image-illuminating means and the image-focusing means so that portions of the medium can be selectively aligned with the projection axis of the viewer; said means for movement comprising a pair of opposed transparent flats adapted to receive the medium therebetween; a first member having a base portion operatively connected to said flats and at least one upright member having a gear rack formed on one surface thereof; a second member having an upwardly extending gear rack formed on one surface thereof and located opposite said gear rack of said first member, said second member being fixedly connected to an index arm; a shaft extending between said first and second members in a plane substantially parallel to said object plane and in a direction substantially perpendicular to said one surface of said first and second members; and gear means slidably mounted on said shaft for operatively connecting said gear racks of said first and second members for movement as a unit in a direction parallel to said shaft and for opposite movement in a direction perpendicular to said shaft;
   (b) an index panel having a surface disposed on the exterior of the viewer adjacent the projection axis so as to be visible to the operator of the viewer;
   (c) means for releasably securing in a predetermined position relative to said index panel an index card corresponding to the format of the particular medium to be received by said means for movement; and
   (d) said index arm extending from said means for movement and having an indicator portion disposed over said index panel to provide in conjunction with said index card an indication of the particular image of the medium optically aligned between the image-illuminating and image-focusing means.

References Cited

UNITED STATES PATENTS

| | | |
|---|---|---|
| 2,192,692 | 3/1940 | Nerwin. |
| 2,232,811 | 2/1941 | Sperry _____ 352—224 |
| 2,633,774 | 4/1953 | Rounsefell _____ 352—104 |
| 3,240,115 | 3/1966 | Robbins et al. _____ 95—42 |
| 3,267,801 | 8/1966 | Abbott et al. |
| 3,288,027 | 11/1966 | Ruzicka. |
| 3,320,854 | 5/1967 | Wally. |
| 3,352,201 | 11/1967 | Brownscombe. |
| 3,369,450 | 2/1968 | Peters. |
| 3,446,552 | 5/1969 | Gross et al. _____ 353—27 |

FOREIGN PATENTS 1,430,277   1/1965   France.

NORTON ANSHER, Primary Examiner

R. M. SHEER, Assistant Examiner

U.S. Cl. X.R.

353—78, 95